(12) United States Patent
McNair (10) Patent No.: US 7,962,162 B2
(45) Date of Patent: Jun. 14, 2011

(54) SIMULCASTING OFDM SYSTEM HAVING MOBILE STATION LOCATION IDENTIFICATION

(75) Inventor: Bruce E. McNair, Holmdel, NJ (US)

(73) Assignee: AT&T Intellectual Property II, L.P., Atlanta, GA (US)

(*) Notice: Subject to any disclaimer, the term of this patent is extended or adjusted under 35 U.S.C. 154(b) by 2133 days.

(21) Appl. No.: 09/924,022

(22) Filed: Aug. 7, 2001

(65) Prior Publication Data
US 2003/0162547 A1 Aug. 28, 2003

(51) Int. Cl.
*H04B 15/00* (2006.01)
(52) U.S. Cl. ............... 455/503; 455/456.1; 455/456.6
(58) Field of Classification Search ............ 455/456.1, 455/456.5, 456.6, 502, 503
See application file for complete search history.

(56) References Cited

U.S. PATENT DOCUMENTS

| | | | |
|---|---|---|---|
| 4,850,032 A * | 7/1989 | Freeburg ............... 455/503 |
| 5,291,289 A | 3/1994 | Hulyalkar et al. |
| 5,452,015 A | 9/1995 | Hulyalkar |
| 5,537,398 A * | 7/1996 | Siwiak ............... 370/204 |
| 5,600,672 A | 2/1997 | Oshima et al. |
| 5,802,117 A | 9/1998 | Ghosh |
| 5,802,241 A | 9/1998 | Oshima |
| 5,812,523 A | 9/1998 | Isaksson et al. |
| 5,815,538 A * | 9/1998 | Grell et al. ............. 375/356 |
| 5,815,814 A | 9/1998 | Dennison et al. |
| 5,867,478 A * | 2/1999 | Baum et al. ............. 370/203 |
| 5,920,598 A | 7/1999 | Hyakudai et al. |
| 5,970,414 A * | 10/1999 | Bi et al. ............. 455/456.3 |
| 5,982,234 A * | 11/1999 | Compagne ............. 330/149 |
| 5,991,334 A | 11/1999 | Papadopoulos et al. |
| 6,009,091 A * | 12/1999 | Stewart et al. ............. 370/342 |
| 6,052,064 A * | 4/2000 | Budnik et al. ............. 340/7.24 |
| 6,130,922 A | 10/2000 | Stott et al. |
| 6,137,847 A | 10/2000 | Stott et al. |
| 6,188,717 B1 | 2/2001 | Kaiser et al. |
| 6,198,782 B1 | 3/2001 | De Courville et al. |
| 6,205,188 B1 | 3/2001 | Stott et al. |
| 6,215,819 B1 | 4/2001 | Hyakudai et al. |
| 6,317,474 B1 * | 11/2001 | Carsello ............. 375/354 |
| 6,356,763 B1 * | 3/2002 | Kangas et al. ............. 455/456.1 |
| 6,442,392 B2 * | 8/2002 | Ruutu et al. ............. 455/456.1 |
| 6,725,045 B2 * | 4/2004 | Oren et al. ............. 455/445 |
| 6,885,630 B2 * | 4/2005 | Kostic et al. ............. 370/203 |
| 2002/0107028 A1 * | 8/2002 | Rantalainen et al. ............. 455/456 |
| 2005/0206566 A1 * | 9/2005 | Stilp et al. ............. 342/455 |

FOREIGN PATENT DOCUMENTS

WO WO-95/00821 1/1995

OTHER PUBLICATIONS

Examiner's Report for CA 2,396,639, Apr. 4, 2005, pp. 1-4.
Examiner's Report for CA 2,396,639, Feb. 6, 2008, pp. 1-4.

* cited by examiner

*Primary Examiner* — Temica M Beamer (57) ABSTRACT

A wireless simulcast system, such as an OFDM network, includes the ability to determine the location of a mobile user. Location-based services can be provided to the mobile user.

24 Claims, 6 Drawing Sheets

SIMULCASTING OFDM SYSTEM HAVING MOBILE STATION LOCATION IDENTIFICATION

CROSS REFERENCE TO RELATED APPLICATIONS

Not Applicable.

STATEMENT REGARDING FEDERALLY SPONSORED RESEARCH

Not Applicable.

FIELD OF THE INVENTION

The present invention relates generally to communication systems and, more particularly, to simulcasting communication systems.

BACKGROUND OF THE INVENTION

As is known in the art, there are a variety of known systems for determining position. For example, Global Positioning Satellite (GPS) systems can identify the coordinates of a person having a GPS device. GPS techniques have also been proposed for determining the position of mobile stations in near real-time. However, such an approach requires specialized hardware components and antennas that add cost, size, weight and extra power consumption to mobile terminals. In addition, GPS devices can disrupt wireless communication, e.g., phone calls from a mobile phone.

Furthermore, since GPS is a satellite-based position determination system, operation depends upon the 'visibility' of a sufficient number of satellites with a proper geometry to provide accurate positional information. For example, it is known that satellites distributed evenly along the horizon provide the best geometry for accurate positioning. However, satellites in this position are the most likely to be blocked by trees or buildings. Overhead satellites are most likely to provide the strongest signals, but several closely spaced overhead satellites result in the worst 'dilution of precision' in determining position. And since the satellites are constantly in motion, relative to the mobile station and relative to each other, location accuracy varies significantly with time.

It would, therefore, be desirable to provide a system that overcomes the aforesaid and other disadvantages.

SUMMARY OF THE INVENTION

The present invention provides a simulcasting OFDM system that can identify the position of a mobile station. With this arrangement, the OFDM system can provide location-based services to a mobile user from one or more of the simulcasting base stations. While the invention is primarily shown and described in conjunction with a simulcasting OFDM system, it is understood that the invention can be applicable to other wireless systems in which it is desirable to determine the position of a mobile station.

In one aspect of the invention, the location of a mobile station is determined from a plurality of simulcast signals received from respective base stations. In an exemplary embodiment, the base stations transmit OFDM signals. Signal time of arrival differences among the received signals can be used to determine the location of the mobile station.

BRIEF DESCRIPTION OF THE DRAWINGS

The invention will be more fully understood from the following detailed description taken in conjunction with the accompanying drawings, in which.

DETAILED DESCRIPTION OF THE INVENTION

Figure 1:
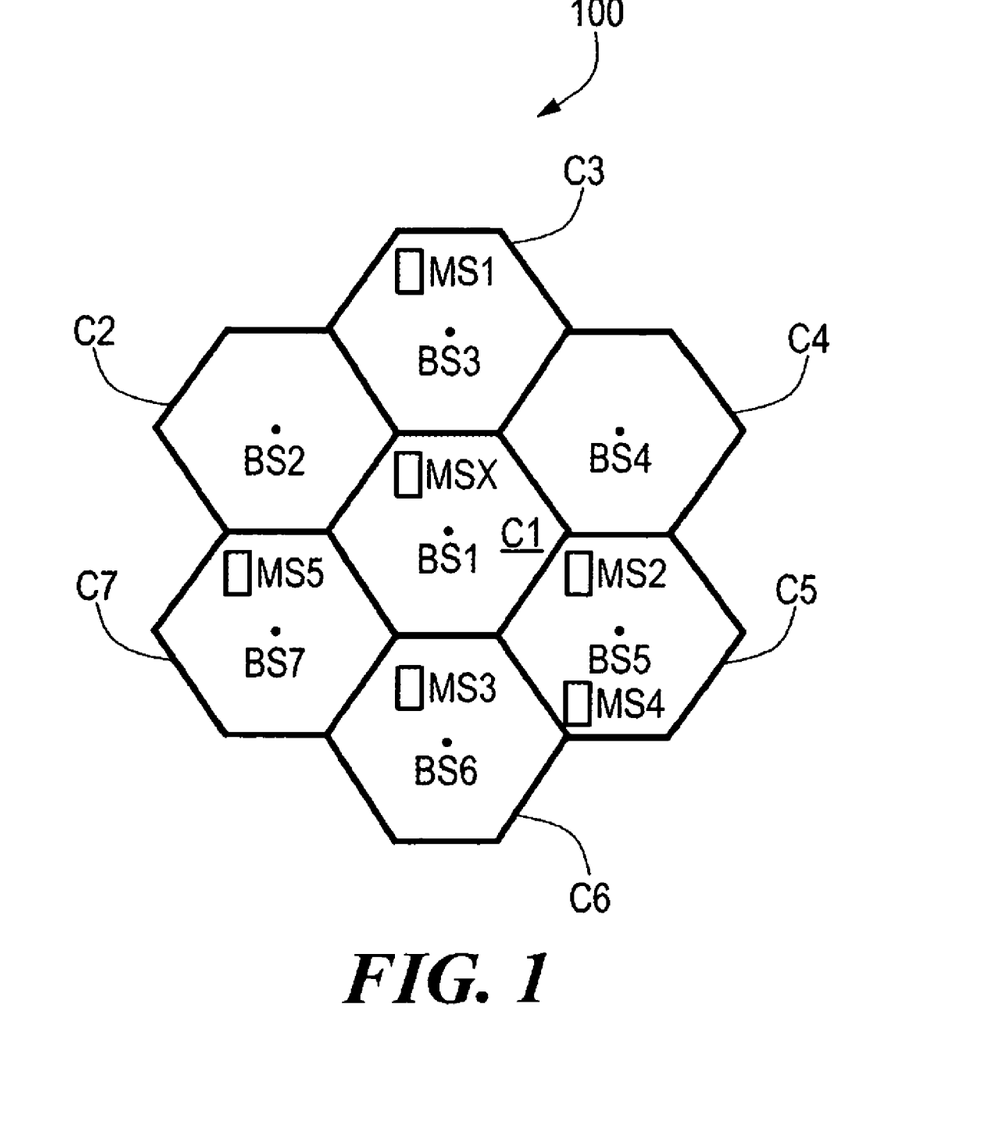
FIG. 1 is a schematic depiction of a simulcasting OFDM system having mobile station position determination in accordance with the present invention.

FIG. 1 shows a simulcasting wireless communication system 100 having mobile station position identification in accordance with the present invention. Simulcasting base stations BS1-BS7 each cover a respective cell or sector C1-C7 in which mobile stations MS1-MSX can be located. In an exemplary embodiment, information contained in simulcast orthogonal frequency division multiplexing (OFDM) signals is used to determine the location of a mobile station.

Simulcasting is well known to one of ordinary skill in the art. In general, simulcasting refers to the broadcast of a given signal by a plurality of base stations BS or transmitters. Mobile stations MS located within the cells covered by the base stations BS receive the signal. The mobile station receives multiple versions of the simulcasted signals, which can improve the system performance by providing better coverage with a stronger signal, as well as better performance because of the lack of co-channel interference.

Figure 2:
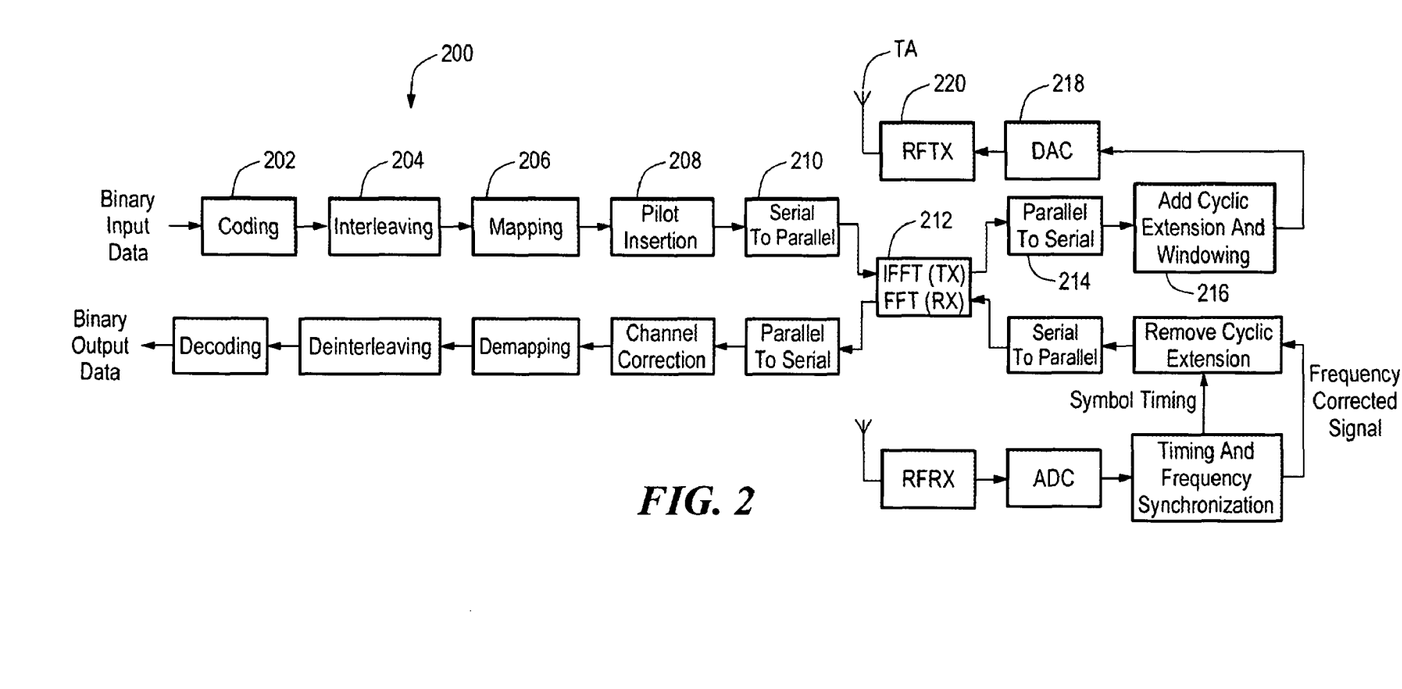
FIG. 2 is a schematic block diagram of an exemplary OFDM system that can form a part of the system of FIG. 1.

Referring briefly to FIG. 2, an exemplary OFDM system 200 that can form part of a system providing mobile station location identification is described. A coding subsystem 202 encodes binary data from a data source. The coded data is interleaved by an interleaving subsystem 204 and then mapped onto multi-amplitude multi-phase constellation symbols by a mapping subsystem 206. In one particular embodiment, the multi-amplitude multi-phase constellation symbols include quadrature phase shift keying (QPSK) symbols. Pilot signals can then inserted by a pilot insertion subsystem 208 to estimate the channel at the remote subscriber unit receivers. A serial-to-parallel conversion subsystem 210 converts the serial data stream to a parallel data stream that is provided to an inverse fast Fourier transform (IFFT) subsystem 212.

The transformed data is converted to serial data stream by a parallel-to-serial converter 214. Cyclic extension and windowing can be added by a subsystem 216 prior to digital-to-analog conversion by a DAC 218 and transmission by an antenna system 220 including one or more transmit antennas TA. The receive portion 222 of the OFDM system includes similar corresponding components for extracting the data from the received OFDM signal.

Figure 3:
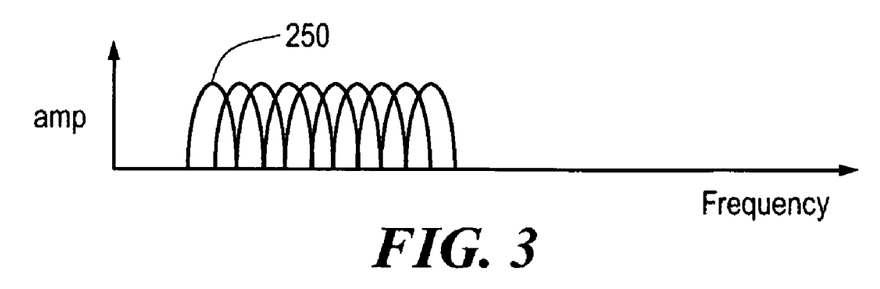
FIG. 3 is a graphical depiction of multiple carriers in an OFDM system that can be used in the system of FIG. 1.
Figure 4:
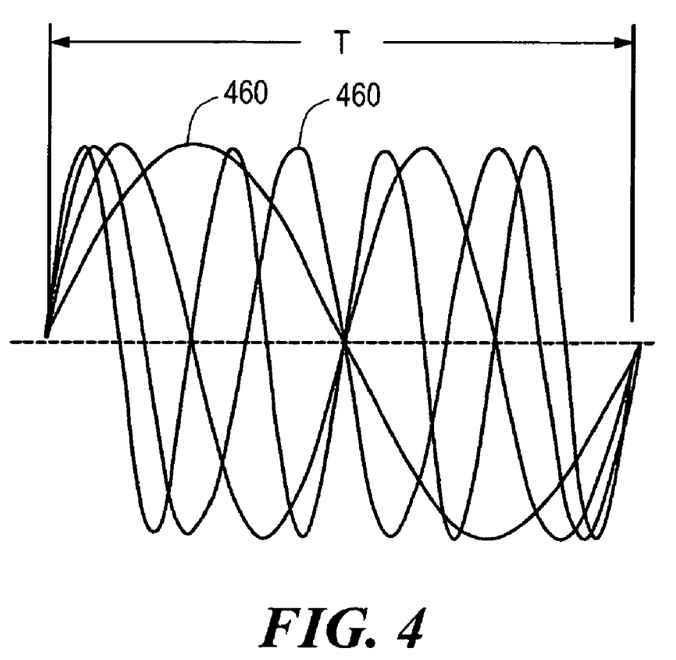
FIG. 4 is a graphical depiction illustrating the orthogonality of OFDM signals that can be used in the system of FIG. 1.

As shown in FIG. 3, the OFDM system utilizes an overlapping orthogonal multicarrier modulation technique having a plurality of subcarriers 250. FIG. 4 shows the orthogonal nature of the subcarriers. More particularly, each of four subcarriers 460 of one OFDM data symbol has an integral number of cycles in the interval T. The number of cycles between adjacent subcarriers differs by one.

Figure 5:
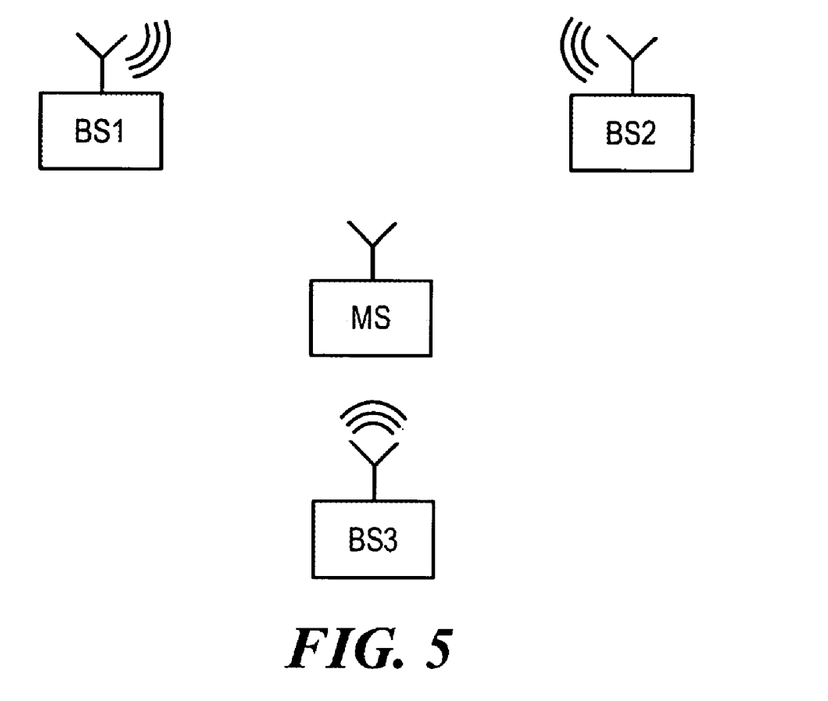
FIG. 5 is a schematic depiction of a mobile station receiving simulcast signals from three base stations in accordance with the present invention.

FIG. 5 shows a mobile station MS receiving signals from first, second, and third simulcasting base stations BS1, BS2, BS3. To obtain location information, the mobile station MS extracts information in the simulcast OFDM signals, as described below. Each OFDM base station BS1-3 transmits data to the mobile station MS by simultaneously modulating several individual carriers over a given bandwidth, e.g., about 5 MHz. To efficiently decode the information, the mobile station MS receiver transforms the received signal into the frequency domain to demodulate the carriers. For optimal practical performance, the mobile receiver estimates the frequency response of the channel to enable coherent demodulation of the carriers. In addition, the mobile station estimates the timing and frequency offset of the mobile station, relative to the base stations.

Simulcasting provides relatively good performance to a large number of users over a large coverage area due to simultaneous transmission of the same information content from multiple base stations. Simulcasting creates an artificial multipath environment used by the OFDM system to create diversity.

In general, in order to coherently demodulate the carriers, the mobile station MS receiver has an estimate of the channel frequency response. As is well known to one of ordinary skill in the art, it is straightforward to transform the channel response back to the time domain to obtain an estimate of the impulse response of the channel. For single base station operation, this channel impulse response provides an instantaneous measure of the multipath environment in which the mobile station is operating. For multiple base station operation, a short term average of the channel impulse response provides direct ranging information to all the nearby base stations. This ranging information, where the delays between peaks of the average impulse response of the channel correspond to relative delays between the paths to the different base stations, can be used to compute the position of the mobile station relative to all the base stations it currently is receiving.

In addition, with the timing and frequency offset estimates that are required for mobile receiver operation, additional information is available to the mobile station that indicates time delay to the individual base stations BS, as well as the Doppler frequency shift induced on the carrier signals caused by motion towards or away from the base stations.

Together, these channel estimates, and time and frequency offset estimates, provide information that can be readily used to determine mobile position, without any special position determining signals or hardware, as described more fully below.

It is understood that horizontal position and wide angular spacing of base stations will provide the best geometry for accurate position determination. Similarly, the same network engineering that provides base station spacing to ensure adequate performance for data communications will allow accurate position determination.

As described above, the OFDM system can simulcast simultaneous transmission of identical information from a plurality of basestations BS1-N. With this arrangement, the link performance is improved by simulating multipath. Since the same signal from multiple base stations is received by a mobile station, the difference in path delay results in frequency selective fading with narrow spacing between multipath nulls interacting with the inherent frequency diversity of the OFDM system.

Figure 6:
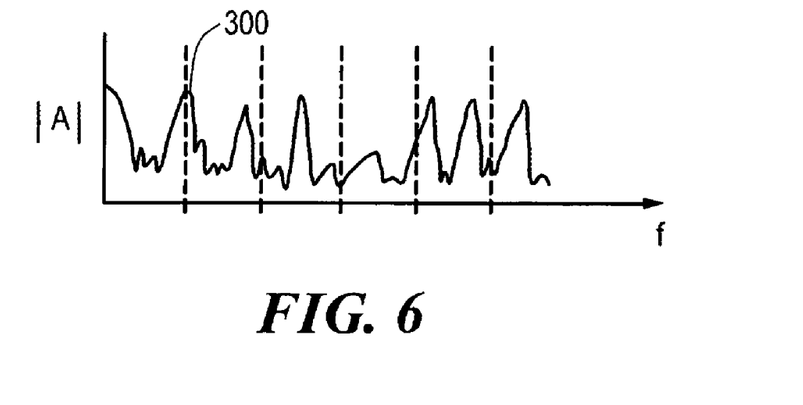
FIG. 6 is a graphical depiction of a signal spectrum of a signal received by a mobile station for three simulcasting base stations in accordance with the present invention.

FIG. 6 shows the frequency spectrum of a signal 300 received by a mobile station from three base stations. The spectrum includes variation due to interference between first and second base stations riding on top of interference between second and third base stations. The OFDM modulation from the received signal can then be removed to enable extraction of the channel response in the frequency domain. It is understood that the signal can be removed because it is known for a training interval or because it is correctly decoded.

Figure 7:
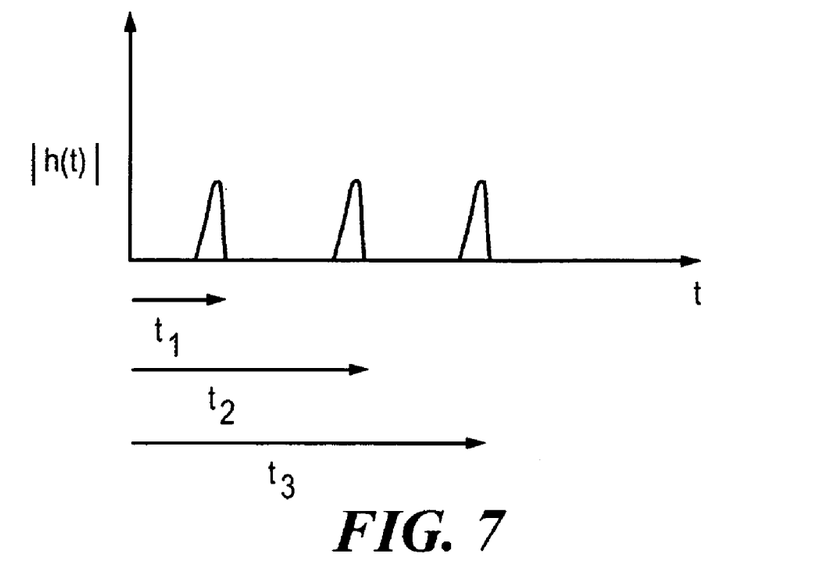
FIG. 7 is a graphical depiction of a channel tone response for an OFDM channel that can be used to determine the location of a mobile station in accordance with the present invention.
Figure 8:
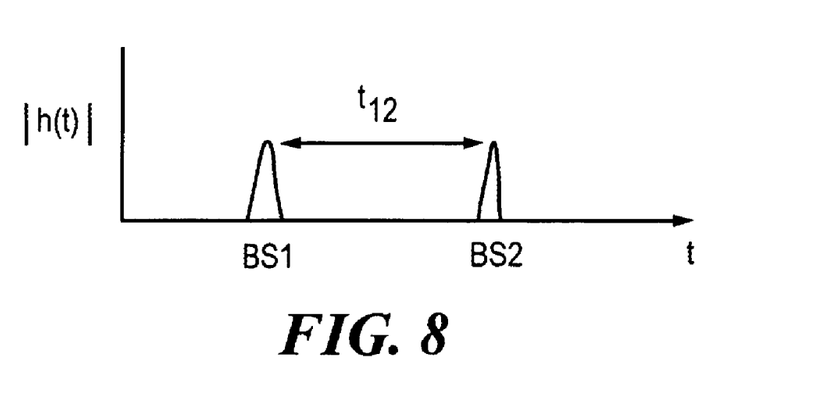
FIG. 8 is a graphical depiction showing a differential delay time for simulcast signals from first and second base stations.

FIG. 7 shows the calculated tone response for the channel calculated from the extracted channel response. As described below, the impulse response of the channel can be translated to position information for the mobile station from signal arrival times $t_1$, $t_2$, $t_3$ from the respective base stations. FIG. 8 shows an impulse response for a mobile station receiving first and second signals from respective base stations with an interarrival time $t_{12}$ or T.

Figure 9:
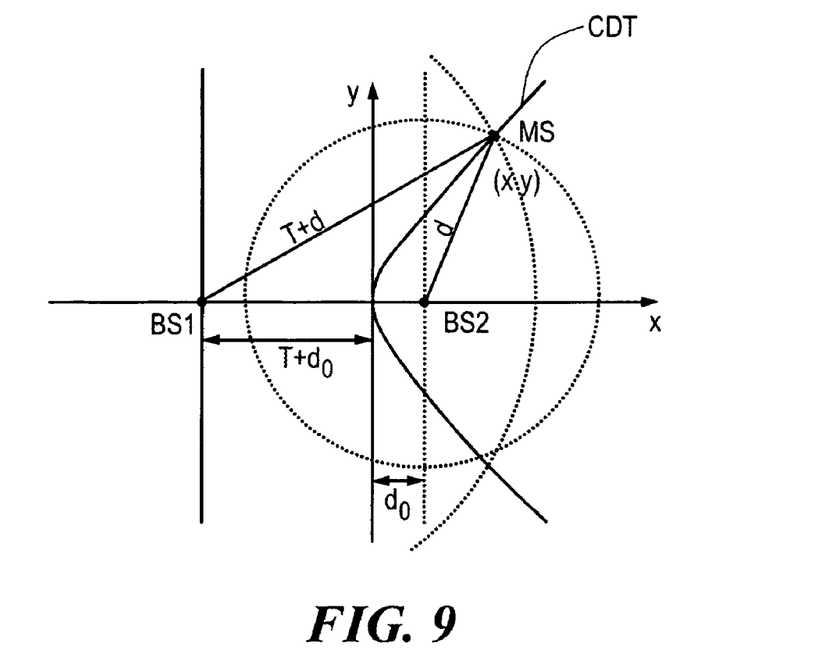
FIG. 9 is a graphical depiction of possible mobile station locations based upon base station signal time of arrival information.

As shown in FIG. 9, from the known interarrival time T ($t_{12}$), the location of the mobile station can be located along a contour CDT of constant difference in time, i.e., a locus of points having a distance from first and second base stations BS, BS2 that differs by T, which defines a hyperbola. It is understood that if only |t1−t2| is known, i.e., t1<t2 or t1>t2, there will be two hyperbolas that define the locus of possible mobile locations with respect to the base stations. The first base station BS1 has coordinates (d0, 0) and the second base station BS2 has coordinates (−d0−T, 0). The hyperbola CDT defines the possible coordinates of the mobile station MS, which is located at the intersection of first and second circles C1, C2 centered about the respective base stations BS1, BS2.

More particularly, a circle is defined be equation 1 below:

$$x^2 + y^2 = r^2 \quad \text{Eq. (1)}$$

where x and y define the x,y coordinates and r is the radius of the circle. The first and second circles C1, C2 about the first and second base stations BS1, BS2 can be expressed as set forth in Equations 2 and 3 below:

$$C1: (x-d_0)^2 + y^2 = d^2 \quad \text{Eq. (2)}$$

$$C2: (x+d_0+T)^2 + y^2 = (d+T)^2 \quad \text{Eq. (3)}$$

These equations can be expanded as follows in Equations 4 and 5:

$$C1: x^2 - 2xd_0 + d_0^2 + y^2 = d^2 \quad \text{Eq. (4)}$$

$$C2: x^2 + 2xd_0 + 2xT + d_0^2 + 2d_0T + T^2 + y^2 = d^2 + 2dT + T^2 \quad \text{Eq. (5)}$$

Since the mobile station MS is at the intersection of the first and second circles, the two equations must be satisfied simultaneously as shown below in Equation 6:

$$x^2 + 2xd_0 + 2xT + d_0^2 + 2d_0T + T^2 + y^2 = \quad \text{Eq. (6)}$$

-continued $$x^2 - 2xd_0 + d_0^2 + y^2 + 2T\sqrt{x^2 - 2xd_0 + d_0^2 + y^2} + T^2$$

After simplifying, each mobile location can be defined in x,y coordinates as set forth below in Equations 7 and 8:

$$y = \sqrt{\left(\frac{d_0^2}{T} + d_0\right)\left(\frac{x^2}{T} + x\right)} \qquad \text{Eq. (7)}$$

$$x = T\frac{(d_0 - d)}{(T + 2d_0)} \qquad \text{Eq. (8)}$$

These equations provide the locus of points that describe possible positions for a mobile station that measures a difference in time delay T between signals from a pair of base stations located as defined above.

Base station locations may be known from the base station ID, which can be contained in the OFDM signals. While base station IDs enable the mobile station to separate multiple loci, such IDs are not necessary since other information can be used to remove this ambiguity. For example, a third base station signal will generate two more hyperbolas, i.e., |t1−t3| and |t2−t3| curves, based upon the position of the mobile station. Thus, three base station signals provide six hyperbolas from which only some of the possible combinations provide physically realizable positions.

It will be readily apparent to one of ordinary skill in the art that additional simulcast signals from additional base stations can be utilized to provide additional mobile location information.

It is understood that synchronizing base stations in time and frequency is routinely used to control interference between base stations. Synchronization can be achieved to relatively close tolerances by locking base station frequency sources to a high stability oscillator or to a common reference signal. For instance, a high accuracy rubidium oscillator can serve as the base station clock source. Alternatively, the base stations could be individually synchronized to transmissions from the GPS network. Since the positions of the base stations are fixed, averaging GPS-derived signals over relatively long periods of time can provide timing accuracy of less than a few nanoseconds, corresponding to positioning errors of a few feet.

The primary source of timing errors in the system of the present invention is due to the accuracy with which time of arrival estimates can be made. If, for instance, the OFDM simulcast transmissions occupy about a 5 MHz bandwidth, then when the signals are transformed into the time domain, the precision of the time measurements is approximately the reciprocal of the bandwidth or about 200 nanoseconds. This level of precision corresponds to a positional accuracy of about 200 feet.

In another aspect of the invention, timing recovery based upon measuring the timing offset by computing a differential in frequency measure of the received signal can be used to measure the time of arrival for position location in an OFDM system. An exemplary timing recovery algorithm is shown and described in U.S. patent application Ser. No. 09/311,562, filed on May 14, 1999, which is incorporated herein by reference.

Figure 10:
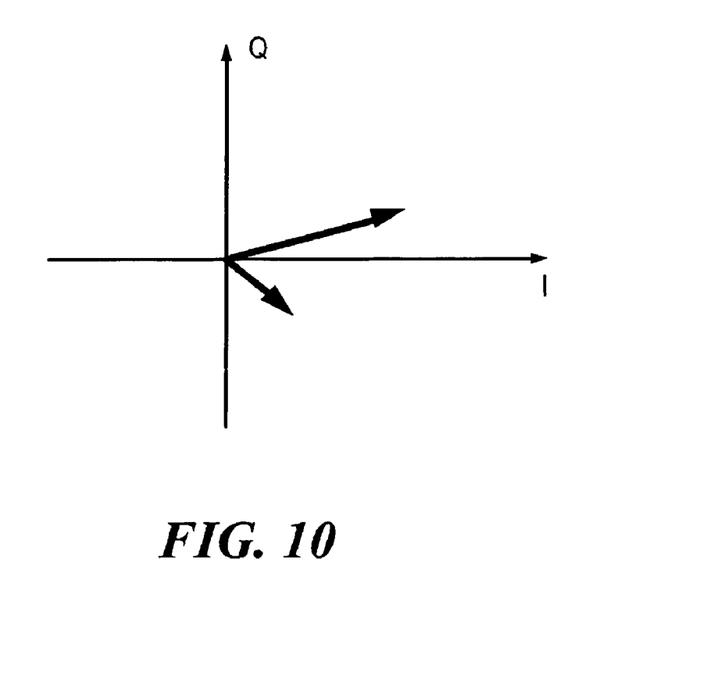
FIG. 10 is a graphical depiction of timing offset rays that can be used for determining mobile station location in accordance with the present invention.

In general, from examination of the differential in frequency timing constellation, it can be seen that multipath reception of the signal creates a set of distinct "rays" where each ray corresponds to the contribution of the timing offset resulting from each multipath component. FIG. 10 shows an exemplary differential in frequency constellation. By adjusting the overall timing to set the centroid of the impulse response to the center of the OFDM FFT interval, the sum $$\sum T_i * \overline{T}_{i-1},$$

where $T_i$ is the complex number corresponding to tone i, is adjusted to the point (1,0) in the complex plane.

In terms of base station timing of arrival information, the dominant traces in the multipath timing adjustment constellation directly correspond to the relative delays to each base station. This is similar to the peaks in the channel impulse response described above. This differential in frequency processing does not require FFT processing to transform the channel response to the time domain.

In another aspect of the invention, mobile station position over time is tracked to resolve possible ambiguities due to unidentified base station and/or undistinguishable interarrival times, which can be due to a mobile being midway between base stations. By tracking mobile position over time, mobile position ambiguity can be resolved. It is understood that a differential in time frequency offset estimation scheme can provide separable estimates of the Doppler offset to each base station based upon samples of the cyclic prefix, for example. By combining velocity information with successive position estimates, mobile station position ambiguities can be resolved.

In a further aspect of the invention, unique transmissions from a first base station to a first mobile station can be utilized to resolve position. For example, the first base station can transmit a point-to-point signal from the first base station to a first mobile station. The first mobile station can use information from a narrow or unicast signal from the first base station to a second mobile station to distinguish first base station transmissions from transmissions of other base stations. Thus, the first mobile station can use transmissions from the first base station intended for other mobile stations since each transmission has an identical time reference due to the simulcast signal transmission. The first mobile station can use transmission timing information to compare relative time of arrivals for first base station transmissions to the time of arrival of simulcast transmissions. Thus, the first mobile station can uniquely distinguish transmissions from the first base station from other base station transmissions.

Having determined its location, a mobile station can transmit this information to the nearest or strongest base station, for example, via a conventional uplink signaling channel.

In a further aspect of the invention, mobile station location can be used to simulcast location specific information to individual or groups of users. For instance, upon receiving the mobile station location, the base station can relay this information to a network server. The network server can then tailor the specific simulcast information to suit the needs of one or more mobile users.

In an exemplary embodiment, the system inserts targeted commercials during a radio broadcast. Since the locations of mobile stations in the simulcast broadcast area are known, the server can insert advertisements that meet the interest profile of a particular mobile user. The advertisements or other information can be transmitted at the most appropriate time for the user to make use of the information, i.e., when they are physically close to the advertised business. In addition, the time of day can be used to determine the broadcast messages. For example, restaurant messages can be broadcast in the late afternoon.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method for determining a location of a mobile station, comprising:
   receiving at the mobile station a plurality of simulcast signals having substantially identical information from a plurality of base stations;
   determining relative time of arrival information for the plurality of simulcast signals that is received;
   determining a position of the mobile station by the mobile station using an average of a channel impulse response obtained from an estimate of a channel frequency response; and
   transmitting the position from the mobile station to one of the plurality of base stations.

2. The method according to claim 1, further including determining the relative time of arrival information using characteristics inherent in the plurality of simulcast signals that is received.

3. The method according to claim 2, wherein the inherent characteristics of the plurality of simulcast signals that is received include a time dispersion due to a simultaneous transmission of the substantially identical simulcast signals.

4. The method according to claim 3, wherein the plurality of simulcast signals having an orthogonal frequency division multiplexing modulation format.

5. The method according to claim 1, further including transforming the channel frequency response to obtain the relative time of arrival information.

6. The method according to claim 1, further including receiving base station identification information in the respective simulcast signals.

7. The method according to claim 1, further receiving global positioning satellite signals for determining the relative time of arrival information.

8. The method according to claim 1, further including utilizing doppler shift information associated with a movement of the mobile station to determine the position of the mobile station.

9. The method according to claim 1, further including computing a locus of points having a distance from first and second ones of the plurality of base stations that differs by a signal time of arrival difference for signals from the first and second ones of the plurality of base stations.

10. The method according to claim 9, further including further loci of points for further pairs of the plurality of base stations.

11. The method according to claim 1, further including computing the relative time of arrival information using differential in frequency information.

12. The method according to claim 1, further including receiving a signal from a first one of the plurality of base stations to a second one of the plurality of base stations for identifying the simulcast signals from respective first or second ones of the plurality of base stations.

13. The method according to claim 1, further including transmitting the position from the one of the plurality of base stations to a network server associated with the one of the plurality of base stations.

14. The method according to claim 1, further including broadcasting information associated with the position.

15. The method according to claim 13, further including broadcasting location-specific advertisements.

16. A method for receiving location information for a mobile station at a base station, comprising:
   transmitting simulcast signals having substantially identical information to the mobile station; and
   receiving, at the base station, mobile station location information from the mobile station determined from relative time of arrival information for the simulcast signals, wherein the mobile station location information is determined by the mobile station using an average of a channel impulse response obtained from an estimate of a channel frequency response.

17. The method according to claim 16, wherein the simulcast signals comprise orthogonal frequency division multiplexing signals.

18. The method according to claim 17, further including transmitting location-specific information to the mobile station.

19. A mobile station, comprising:
   a receiver for receiving simulcast signals having substantially identical information from a plurality of base stations;
   a processor for determining time of arrival information for the simulcast signals that are received and identifying a location of the mobile station using an average of a channel impulse response obtained from an estimate of a channel frequency response; and
   a transmitter for transmitting the location to one of the plurality of base stations.

20. The mobile station according to claim 19, wherein the simulcast signals are orthogonal frequency division multiplexing signals.

21. A wireless network for providing location specific information, comprising:
   a mobile station for receiving simulcast signals and determining a location of the mobile station using an average of a channel impulse response obtained from an estimate of a channel frequency response; and
   a plurality of base stations for transmitting the simulcast signals having substantially identical information and receiving the location of the mobile station transmitted from the mobile station.

22. The wireless network according to claim 21, wherein the simulcast signals are orthogonal frequency division multiplexing signals.

23. The wireless network according to claim 21, further including at least one network server for providing location-specific information to the mobile station based upon mobile station location information provided to one of the plurality of base stations.

24. A wireless network, comprising:
   a plurality of base stations for transmitting simulcast signals having substantially identical information to mobile stations and receiving mobile station location information derived by the mobile stations using an average of a channel impulse response obtained from an estimate of a channel frequency response to broadcast location specific information to the mobile stations.

* * * * *